April 30, 1963 H. FISCHER 3,087,588
ONE-WAY ENGAGING MECHANISM
Filed June 9, 1958
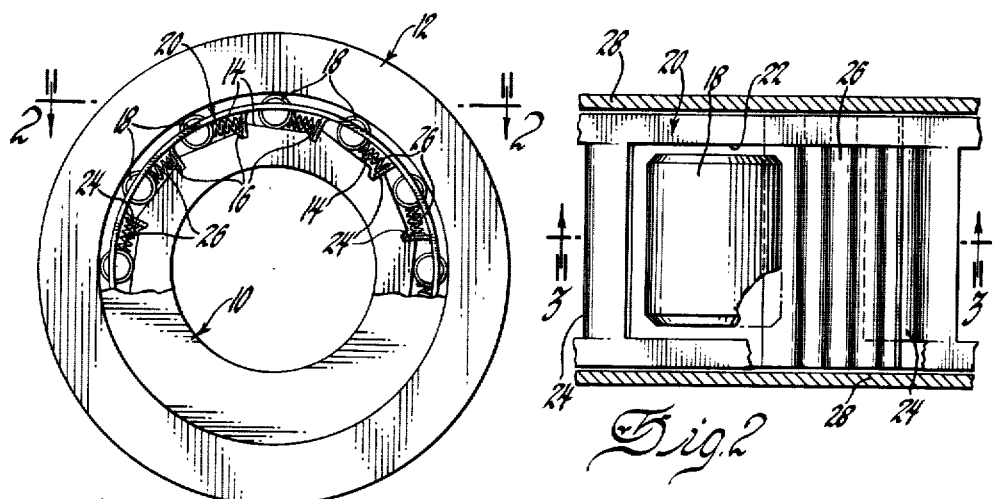
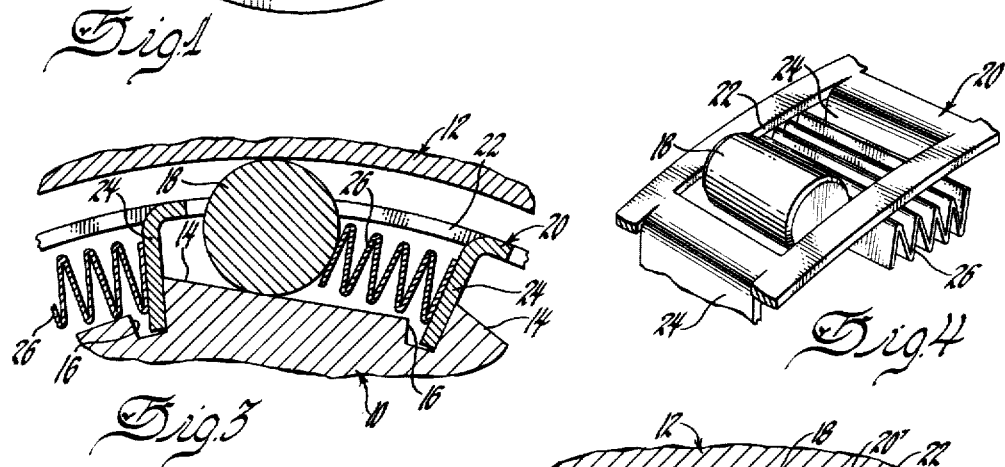
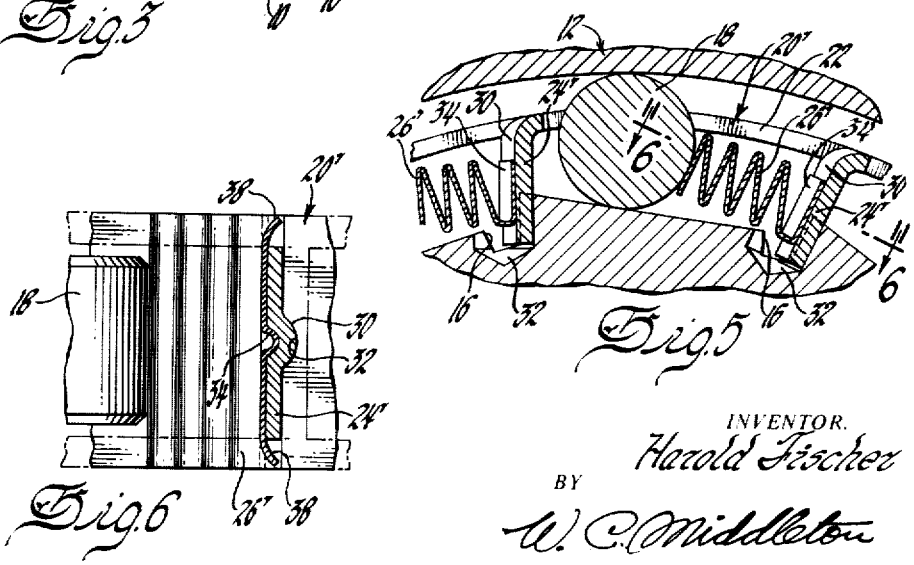
INVENTOR.
Harold Fischer
BY
W. C. Middleton
ATTORNEY United States Patent Office 3,087,588
Patented Apr. 30, 1963

3,087,588
ONE-WAY ENGAGING MECHANISM
Harold Fischer, Flint, Mich., assignor to General Motors Corporation, Detroit, Mich., a corporation of Delaware
Filed June 9, 1958, Ser. No. 740,619
4 Claims. (Cl. 192—45)

This invention relates to one-way engaging mechanisms of the character that have a series of wedging devices operating between a pair of races so as to prevent relative rotation therebetween in one direction only.

Constant efforts are being made to design improved one-way engaging mechanisms, such as clutches, that fully utilize mass production facilities so as to reduce unit costs. Any such design should not be a comprise of the basic requirements, foremost of which are, load carrying capacity, ease of assembly, accuracy and durability. Also, because these one-way clutches are suited for numerous applications, efficient operation with a minimum number of components, although always desirable in any mechanisms, is even more essential and, therefore, is an important objective in each design.

With the foregoing in mind, the invention contemplates a one-way engaging mechanism that is particularly suited for mass production techniques, that meets general load carrying capacity, ease of assembly, accuracy and durability requirements, and that has a minimum number of components effectively utilized for efficient operation.

In one-way engaging mechanisms, the wedging devices are often enclosed within pockets between the races by a series of integral extensions on one of the races. These extensions keep the wedging devices separated and in the proper positions, as well as support energizing springs, which urge the wedging devices to the locking or wedging position with respect to the races. Formation of such extensions integral with one of the races presents machining problems, particularly as to hardening and grinding the cam surfaces between the extensions. Also, the added material is expensive, since the races are made of high grade material, generally unnecessary for the intended function of the extensions. Consequently, it is desirable to employ cages, usually formed as metal stampings, for positioning the wedging devices and aiding in the assembly of the clutch. However, cages being a separate component must not interfere with the alignment or positions of the wedging devices and must not shift axially or become eccentric during operation. Moreover, some sort of energization for urging the wedging devices to the wedging position must be provided.

Accordingly, the invention provides cage structure that may be easily fabricated, that has provisions for accurately spacing the wedging devices, that affords a support for wedging device energizing springs, and that revolves with one of the races so as to both accurately space the wedging devices and effectively control the eccentricities of the cage with respect to the races.

More particularly, the invention provides a cage structure with a series of circumferentially spaced windows in which the wedging devices are positioned and includes transversely extending flanges which furnish an abutment for the energizing springs and which engage one of the races so as to prevent rotation therebetween.

Also, by the invention, cage structure of the foregoing character may be prevented from sidewise movement relative to the races in a novel way. The cages are provided with deformations which have corresponding indentations in the one race and like deformations in the energizing springs so as to axially position these components relative to each other.

In carrying out the invention, according to one form thereof, a series of wedging devices are interposed between concentric inner and outer races. One of the races, in this embodiment the inner race, is provided with a series of cam surfaces, each being separated from the other by axially extending recesses in the periphery of the race. Cage structure is disposed between the races and has circumferentially spaced windows for receiving the wedging devices. Inwardly projecting integral flanges on the cage next to each window have the terminal ends thereof in engagement with the race recesses so as to cause the cage and the inner race to revolve together. Interposed between each flange and the adjacent wedging device is a flat spring of sinuous configuration which functions to urge the wedging device along the cam surface and towards the clutch engaging or wedging position. Consequently, the cage and the springs together accurately position the wedging devices, establishing proper alignment at all times.

In one form of the mechanism, side rings enclose the mechanism wedging devices and a cage therefor preventing sidewise movement of the unit. By another form, projecting cage flanges are formed with deformations which mate with the indentations in a surface of the recess, and a corresponding deformation in the abutting surface of the springs so that the cage, race and springs are fixed axially.

The foregoing and other objects and advantages of the invention will be apparent from the following description and the accompanying drawings in which:

FIGURE 1 is a side elevational view of a one-way clutch embodying the principles of the invention;

FIGURE 2 is a fragmentary sectional view along line 2—2 of FIGURE 1;

FIGURE 3 is a fragmentary sectional view along line 3—3 of FIGURE 2;

FIGURE 4 is a perspective view of a portion of the clutch;

FIGURE 5 is a fragmentary sectional view similar to FIGURE 3 of a modified form of the clutch; and FIGURE 6 is a fragmentary sectional view similar to FIGURE 2 along line 6—6 of FIGURE 5.

Referring to the drawings, and particularly to FIGURE 1, the one-way clutch, depicted for demonstrating the invention, is of the character comprising concentric inner and outer races, designated generally at 10 and 12. The outer diameter or periphery of the inner race 10 is provided with a series of equally spaced cam surfaces of a predetermined slope, while the inner diameter of the outer race 12 is substantially cylindrical. Between the high and low points of the adjacent inner race cam surfaces 14 are recesses 16 extending axially across the perihery of the inner race 10. As can be seen, the inner race is particularly suited for mass production broaching operations, which can easily generate the illustrated profile. Moreover, recesses 16 afford an undercut between the adjacent cam surfaces 14, desirable for finish grinding operations of the hardened cam surfaces.

Between the inner and outer races 10 and 12 are a number of wedging devices, such as roller elements 18 for each cam surface 14. The positioning of the roller elements 18 is established by cage structure, denoted generally at 20. As best viewed in FIGURES 2 and 4, the cage 20 is formed with circumferentially spaced openings or windows 22, each of which encloses one of the roller elements 18. Preferably, the cage 20 is made of a light metallic material of the type especially adapted for stamping operations. When the windows 22 are formed by stamping, a portion of the metal may be retained after each landing step so as to provide, at the edge of each window, integral substantially radially inwardly projecting tabs or flanges 24. With the cage 20 in the installed position, the inner ends of the flanges 24 are received within the inner race recesses 16 and thereby control any tendency of the cage 20 to become eccentric relative to the inner and outer races 10 and 12. In addition, relative rotation between the cage 20 and the inner race 10 is limited by the width of the recesses 16, which can be selected to conform to the operational requirements.

The integral flanges 24 serve another function and that is to provide an abutment for a series of springs 26. Each of these springs 26 is made of a flat spring-like material and is commonly referred to as an accordian type spring because of the wavy or sinuous shape. One of the springs 26 is interposed, as in FIGURE 3, between each roller element 18 and the adjacent cage flange 24, thereby biasing the roller element 18 up the slope of the cam surface 14 towards the wedging or locking position relative to the inner and outer races 10 and 12. Consequently, the clutch is alway prepared to lock instantly, but without the bias from the springs 26 producing any excessive wear between the engaging surfaces. The springs 26 also compensate for slight differences in sizes of the roller elements 18 so that each is in engagement properly, though over or under size, and in so doing lessens any tendency for the clutch to rattle during overrun or free wheeling, at which time the clutch is unlocked.

As so far explained, it can be seen that the cage 20 can be slidably positioned on the inner race 10 when the flanges 24 have been aligned with the inner race recesses 16 and the spring 26 and roller element 18 positioned within the windows 22, either before or after this step, after which the outer race 12 is installed. To complete the assembly, side rings 28, as shown in FIGURE 2, are placed on each side of the cage 20 so as to limit sidewise movement of the cage 20.

In a modified form of the clutch, the rings 28 may be eliminated in the construction shown in FIGURES 5 and 6. In this arrangement flanges 24' on the cage 20' are provided with deformations, such as at 30, extending radially along the middle of the flange 24'. The deformation 30 is of such shape that it may be easily provided by another stamping step during the formation of the cage 20'. As seen in FIGURE 5, indentations 32 are made, e.g., by a drill point, a punch or equivalent, in the periphery of the inner race between the adjacent cam surfaces approximately mid-way between the side edges of the race 10. Preferably, these indentations 32 are made before the recesses 16 are cut so that the remaining portion, after the recesses 16 are cut, is of a diameter that will conform to that of the deformation 30 on the flange. Also, each of the springs 26' is afforded a corresponding deformation 34 so that, when the springs 26' and the cage 20' are installed, the indentation 32, deformations 30 and 34, will all align and mate, as in FIGURE 6, axially positioning these parts, with respect to the inner race 10. As an added insurance against sidewise movement of the springs 26', the outer ends of each spring may be inturned, as at 38, to partially embrace the edges of the flanges 24.

Both forms of the one-way clutch described operate in the conventional manner. To summarize, assuming that the outer race 12 is held, the inner race will be prevented from revolving in a clockwise direction, as viewed in FIGURE 1, since each of the roller elements 18 will be forced progressively into a smaller space as the roller element 18 travels up the inner race cam surface 14 until a wedge results with the roller element 18, snugly in engagement with the surfaces of both the inner and outer races 10 and 12. The inner race 10 is, however, free to revolve in a counterclockwise direction, since each of the roller elements 18 will be caused to move down the cam surfaces 14 with only a slight tickling engagement between the roller elements 18 and the adjacent race surfaces being produced by the bias from spring 26. Hence, if both the inner and outer races 10 and 12 are revolving the inner race 10 cannot revolve faster in a clockwise direction than the outer race 12, but can revolve faster in a counterclockwise direction. Also, the outer race 12 may be revolved clockwise and the inner race 10 counterclockwise without the clutch engaging.

From the foregoing, it can be seen that the inner race 10 is designed for high production methods as demonstrated by the fact that the recesses 16 separate the adjacent cam surfaces, desirable for grinding operations, and do not require any separate machining operation, but may be obtained at the same time that the cam surfaces 14 are generated. The cage structure 20 is also suited for rapid production, the flanges 24 being obtained when the windows 20 are made in the cage. In the modified form, the deformations 30 and 34, respectively, in the cage flange 24' and the spring 26' may be produced during a stamping operation, whereas the indentation 32, in the inner race 10, remains after the recesses 16 are produced, assuming that the indentation 32 is produced before the recess 16. As a result, a compact one-way clutch is obtained with a minimum number of components.

The invention is to be limited only by the following claims.

I claim:

1. A one-way engaging mechanism comprising a pair of concentric races, one of the races including a series of peripherally spaced cam surfaces separated by axially extending recesses, a plurality of roller elements positioned between the races, a cage provided with circumferentially spaced windows for receiving the wedging devices and having transversely projecting flanges integrally formed therewith adjacent each window respectively engaging within the race recesses so as to prevent relative rotation between the cage and race, and a spring of sinuous configuration interposed between each cage flange and wedging device for respectively urging each wedging device towards wedging engagement with the races, each of the springs having the ends formed so as to embrace the edges of each flange and thereby maintain the relative axial positions therebetween.

2. A one-way engaging mechanism comprising a pair of concentric races, one of the races being formed with spaced recesses in the periphery thereof, a plurality of wedging devices positioned between the races, a cage provided with circumferentially spaced windows for receiving the wedging devices and having transversely projecting flanges respectively engaging within the race recesses so as to prevent relative rotation therebetween, a spring interposed between each wedging device and the adjacent cage flange for respectively urging each wedging device towards wedging engagement with the races, and deformations formed in each cage flange, the deformations being in engagement with corresponding deformations in each of the race recesses and each spring for maintaining the relative axial positions of both the spring with respect to the cage and the cage with respect to said one of the races.

3. A one-way engaging mechanism comprising a pair of concentric races, one of the races being formed with spaced recesses in the periphery thereof, a plurality of wedging devices positioned between the races, a cage provided with circumferentially spaced windows for receiving the wedging devices and having transversely projecting flanges adjacent each window respectively engaging within the race recesses so as to prevent relative rotation therebetween, a spring interposed each wedging device and the adjacent cage flange for respectively urging each wedging device towards wedging engagement with the races, each spring and each cage flange being formed along the abutting surfaces thereof with corresponding mating deformations for maintaining the axial positions therebetween, the recesses in said one of the races each having indentations in a surface thereof mating with the deformations in the cage flange so as to position axially the cage relative to said one of the races.

4. A one-way engaging mechanism comprising inner and outer concentric races, the inner race including a series of peripherally spaced cam surfaces separated by axially extending recesses, a plurality of roller elements positioned between the races, a cage provided with circumferentially spaced windows for receiving the wedging devices and having radially inwardly extending flanges integrally formed therewith adjacent each window respectively engaging the race recesses so as to prevent relative rotation therebetween, a spring of sinuous configuration interposed between each roller element and the adjacent cage flange for respectively urging each roller element towards wedging engagement with the races, outwardly extending deformations in each cage flange mating with corresponding deformations in the abutting surfaces of the spring for maintaining the relative axial positions thereof, each of the springs having inturned ends engaging the cage flange edges to assist in maintaining the relative axial positions therebetween, the recesses in the inner race each being provided with an indentation in the surface thereof for mating with the cage flange deformation so as to position axially the cage relative to the inner race.

References Cited in the file of this patent
UNITED STATES PATENTS

| | | |
|---|---|---|
| 2,371,653 | Schuckers | Mar. 20, 1945 |
| 2,843,238 | Rozner | July 15, 1958 |

UNITED STATES PATENT OFFICE
CERTIFICATE OF CORRECTION

Patent No. 3,087,588                          April 30, 1963

Harold Fischer

It is hereby certified that error appears in the above numbered patent requiring correction and that the said Letters Patent should read as corrected below.

Column 2, line 68, for "landing" read -- lancing --; column 4, line 65, after "interposed" insert -- between --.

Signed and sealed this 26th day of November 1963.

(SEAL)
Attest:
ERNEST W. SWIDER

Attesting Officer

EDWIN L. REYNOLDS

Acting Commissioner of Patents